July 17, 1923.  1,461,915
V. KREFL
SHOCK ABSORBER
Filed March 25, 1921
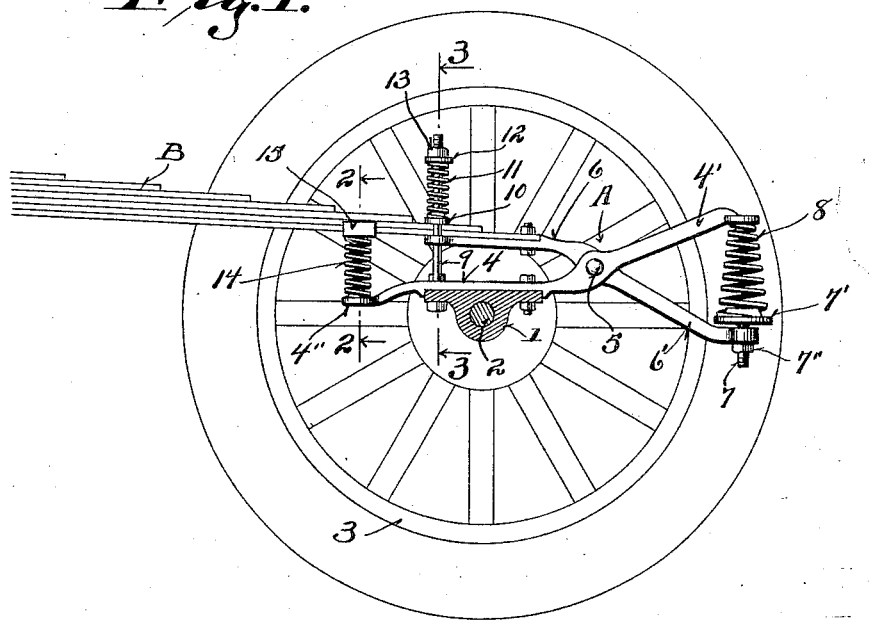
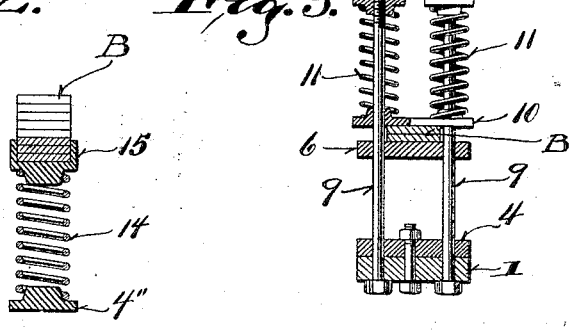
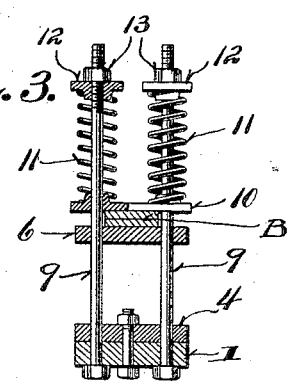
Inventor:
Victor Krefl Patented July 17, 1923.

1,461,915

UNITED STATES PATENT OFFICE.

VICTOR KREFL, OF TWO RIVERS, WISCONSIN.

SHOCK ABSORBER.

Application filed March 25, 1921. Serial No. 455,520.

*To all whom it may concern:*

Be it known that I, VICTOR KREFL, a citizen of the United States, and resident of Two Rivers, in the county of Manitowoc and State of Wisconsin, have invented certain new and useful Improvements in Shock Absorbers; and I do hereby declare that the following is a full, clear, and exact description thereof.

My invention refers to shock absorbers as suggested in my application for patent for improvements in shock absorbers, filed February 10, 1921, Serial No. 443885.

The object of my present invention is to provide auxiliary spring mechanism associated with relatively yieldable load supports, the construction and arrangement being a pivotally connected cross link mechanism, having ends anchored to the load supports, and other ends opposed by a primary spring. The yieldable load supports are further equipped with recoil and auxiliary spring units, whereby the mechanism, as a whole, will extend the ordinary type of leaf spring and at the same time will absorb a shock both direct and recoil in an effective manner, to thereby increase the efficiency of the yieldable load supports to insure easy riding, and also materially lighten the weight of the vehicle elements, due to the fact that vibration is reduced to a minimum.

With the above objects in view, the invention consists in certain peculiarities of construction and combination of parts as are hereinafter set forth with reference to the accompanying drawings and subsequently claimed.

In the drawings:

Figure 1 represents a side elevation of a vehicle wheel, axle and associated leaf spring, the parts being fitted with a shock absorber unit embodying the features of my invention.

Figure 2 is a detailed cross section of the same, the section being indicated by line 2—2 of Figure 1.

Figure 3 is a similar cross sectional view, the plane of the same being indicated by line 3—3 of Figure 1.

Referring by characters to the drawings, 1 represents an axle housing in which is mounted a standard axle 2 that carries wheels 3. The axle housing is provided with pads, only one of which is shown. Each pad has secured thereto a rear lower arm 4 of a pair of cross links A, which links are hingedly connected by pivot bolts 5. The upper rear arm 6 of the cross links is bolted, or otherwise secured to the end of any standard type of leaf spring B, and the front crossed arms 4' and 6' of the link members terminate with pads, the lower one of which has adjustably threaded therein, the stem 7 of a spring supporting disk 7'.

Interposed between the spring supporting disk and the pad of the upper arm 4' is a compression coil spring 8, which coil spring may be adjusted as to tension by rotation of the disk stem up or down, it being understood that said stem is thereafter locked in its adjusted position by a nut 7''.

As best shown in Figure 3 of the drawings, the rear upper arm 6 of the cross link element is provided with offset apertured ears, which serve as guides for a pair of spring retaining rods 9. The rods are anchored by passing through apertures in the pad of the axle housing and corresponding apertures in the arm 4 of the link member. These rods project above the leaf spring and have loosely mounted thereon and resting upon the leaf spring, a plate 10 which serves as a support for the coil spring units 11—11, the upper ends of which are seated upon washers 12—12 that are adjusted for the purpose of regulating the tension of the coil spring and which adjustment is controlled by nuts 13, in threaded union with the upper ends of the rods.

The lower arm 4 of the cross link element has a finger extension 4'', which finger extension serves as a seat for the lower end of the coil spring 14, the upper end of said spring being in engagement with a pad-block 15 that is fitted to the lower face of the leaf spring B.

Thus it will be seen that the front cross arms of the links have mounted therebetween what might be termed a "primary" spring 8, previously referred to. The springs 11 which are carried by the rods 9 may be termed "recoil" springs, while the spring 14 may be termed an "auxiliary" spring, due to the fact that it stiffens or reinforces the main leaf spring B.

From the foregoing description it will be obvious that minor downward vibrations, due to low strain, will be absorbed by movement of the main spring B and compression of the auxiliary spring 14, the recoil vibrations being absorbed by the coil springs 11. Under heavy shock conditions, the primary coil spring 8 will finally come into play so as to work in conjunction with the leaf spring B, and the auxiliary spring 14, it being understood that in a recoil action, under all conditions, the springs 11 will serve to absorb the shock, while shock in the opposite direction is absorbed by the auxiliary and primary springs previously mentioned.

Owing to various experiments it has been found in actual practice, that the construction set forth herein will meet the requirements of a shock absorber and the problem, as solved, reduces the cost of manufacture to a minimum, bearing in mind that the equipment can be readily attached to vehicles of certain standard types, without calling in the aid of skilled mechanics for cutting or fitting the standard parts of such vehicles that may require a shock absorber attachment. Obviously when the absorber, as constructed, is built as a unit, certain of the details of construction with special reference to securing the upper and lower arms 4 and 6, may be varied without departing from the spirit of my invention.

I claim:

1. In a vehicle having a fixed support, a leaf spring positioned over the fixed support, pivoted cross links having ends secured to the fixed support and leaf spring, a coil spring interposed between the free arms of the cross links, tie members extending from the fixed support above the leaf spring, and recoil springs carried by the tie members engageable with the aforesaid leaf spring.

2. In a vehicle having a fixed support, a leaf spring suspended thereon, pivoted cross links having arms rigidly secured to the fixed support and to the end of the leaf spring, a primary spring interposed between the free ends of the cross links, a coil spring interposed between the bottom face of the leaf spring and fixed support, rods extending upwardly from the fixed support and beyond the leaf spring, and coil springs carried by the rods engageable with the upper face of the aforesaid leaf spring.

3. The combination of two levers, a pivot connecting the levers at their middles, a leaf spring secured to the arm of one of said levers, a load support on the adjacent arm of the other lever, resilient means interposed between the second mentioned arm and the leaf spring exerting force to prevent the approach of said second mentioned arm and said leaf spring, resilient means exerting force to prevent separation of said second mentioned arm and said leaf spring, and a spring interposed and contacting with the free ends of said levers.

In testimony that I claim the foregoing I have hereunto set my hand at Two Rivers, in the county of Manitowoc and State of Wisconsin.

VICTOR KREFL.